No. 821,199. PATENTED MAY 22, 1906.
W. STRAWBRIDGE.
MEANS AND APPARATUS FOR TRAPPING RABBITS AND OTHER ANIMALS.
APPLICATION FILED AUG. 6, 1903.
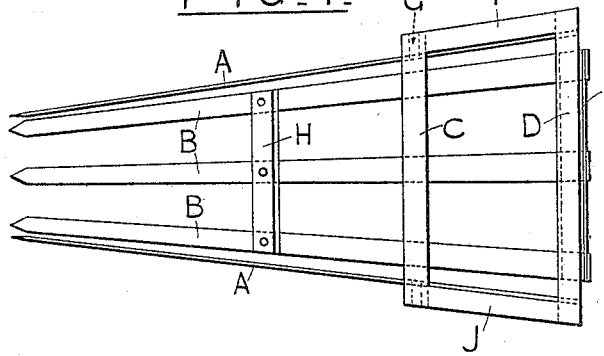
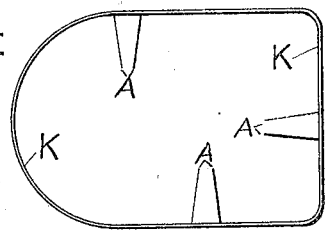
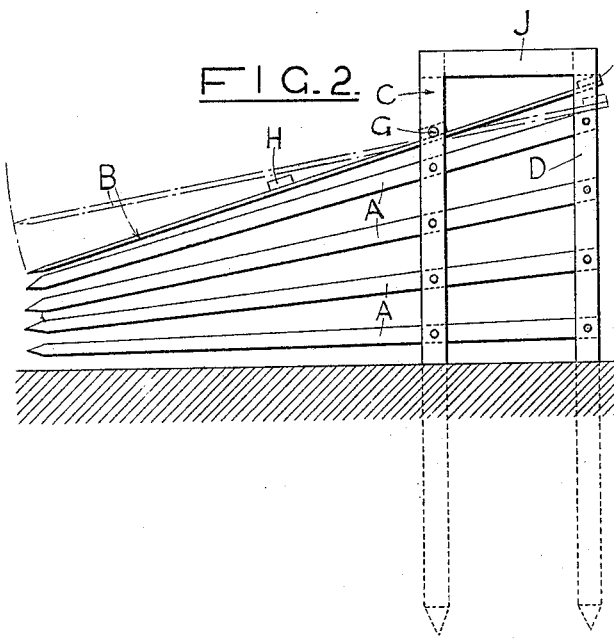
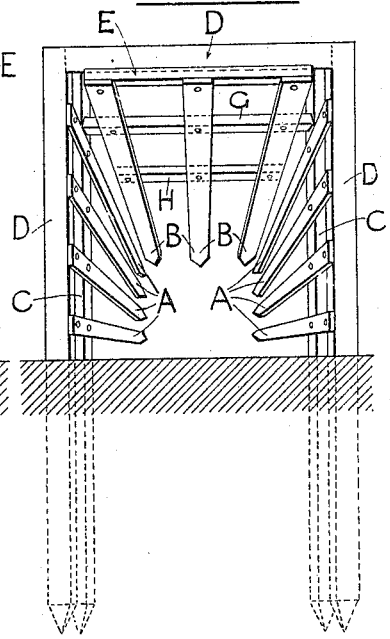
Witnesses:
Inventor:
William Strawbridge
By W. R. Hutchinson Attorney

UNITED STATES PATENT OFFICE.

WILLIAM STRAWBRIDGE, OF BURNSIDE, SOUTH AUSTRALIA, AUSTRALIA.

MEANS AND APPARATUS FOR TRAPPING RABBITS AND OTHER ANIMALS.

No. 821,199.  Specification of Letters Patent.  Patented May 22, 1906.

Application filed August 6, 1903. Serial No. 168,435.

*To all whom it may concern:*

Be it known that I, WILLIAM STRAWBRIDGE, civil servant, a subject of the King of Great Britain and Ireland, and a resident of Greenhill Road, Burnside, State of South Australia, Commonwealth of Australia, have invented a certain new and useful Improved Means and Apparatus for Trapping Rabbits and other Animals, of which the following is a specification.

This invention is devised to supply an improved and effective means of trapping rabbits and other animals. The specification and drawings are prepared giving dimensions suitable for rabbits. The size and strength may be increased and details varied so as to provide traps for foxes and other vermin.

In operating my invention an inclosure is formed of any desired size around water or otherwise with a suitable number of ingress-openings. Each opening has fitted abutting thereto a diminishing passage constructed upon gate-like supports and leading from the opening in the net fence to the inside of the inclosure. The diminishing passage constitutes my trap, which is constructed and arranged as hereinafter described and so that the rabbits may and actually do, as I have proved by experiment, pass inward with such ease and so little resistance that they will enter freely and when they have passed in return is made impossible.

In order that my invention may be clearly understood, I will describe the same with reference to the accompanying drawings, in which—

Figure 1 is a plan, Fig. 2 is a side view, and Fig. 3 is a front view, of my improved trap. Fig. 4 is a diagrammatic plan of an inclosure with three traps in position.

The diminishing entry-passages are composed of laths of spring-steel fastened upon two gate-like supports of suitable strength, such as one-half-inch by three-eighths-inch steel or iron bent over to form a flattened arch. From the opening in the inclosure the diminishing entrance-passage is constructed. The two sides are each formed of a number of longitudinal strips or laths A of one-sixteenth-inch steel fastened by rivets or otherwise to the vertical members, the sides slanting inward. The top is formed of a number of laths B of one-eighth-inch steel fastened to cross-bars, as specified. The laths narrow toward and are pointed at the interior ends. The proportions are such that while the opening or gate is large enough to allow a rabbit to enter easily the inner end is so small that it cannot get through without pushing. The side laths are rigidly fixed to the vertical members of the gate-like supports C C and D D. The laths forming the top are fastened rigidly to a plan cross-bar E and to the axial bar G, which has its ends rounded and fitting into a pair of journal-holes, one in each of the inner vertical members C. A weighting-bar H is placed between the axial bar G and the inner end of the passage, with means for adjusting so that it may be set on the balance. The laths B being hinged at G are raised, as shown by the dotted lines in Fig. 2, by the slightest pressure as the rabbit goes through and then immediately fall by gravity to their original position.

The two gate-like supports C and D are joined at the top by longitudinal bars I J, secured by welding or other means. The ends of the vertical members are pointed, so as to be easily forced into the ground. The structure forming the entrance-passage is complete in itself and is placed in juxtaposition inside the opening in the new inclosure K. Another way of forming the gate-like supports is to cut and stamp a piece of plate-steel the requisite shape, bending the strips into the position to constitute the vertical members, and drilling the journal-holes in C C to carry the ends of the axial bar G.

In operation the inclosure may be made attractive by water, green-feed, or other baits, or the trap-openings may be placed at such positions that the rabbits will be likely to find and pass through them. The rabbits pass in at the openings and along the diminishing passage. The steel laths at the side and top offer such slight resistance to pressure that the rabbit passes through easily and without fear. The top and sides immediately the pressure is removed return to their normal position and effectually prevent egress.

I am aware that pointed wires have been arranged in funnel-shaped entrances and that hinged doors have been proposed and tested; but none of such appliances have proved effective.

Having now particularly described and ascertained the nature of my said invention and in what manner the same is to be performed, I declare that what I claim is—

1. An apparatus of the kind described, comprising outer and inner gate-like frames, flexible metallic laths pointed at the free ends and secured to the frames to form the sides of a diminishing entry-passage, and a top piece pivoted in the inner frame so as to swing vertically, the said top piece being also formed of metallic laths with the ends at the smaller part of the device left free and pointed.

2. An apparatus of the kind described, comprising an outer frame, an inner frame narrower than the outer frame, flexible strips secured to the frames forming the sides of a diminishing entry-passage, a top piece arranged to swing vertically and lying normally in a position approximately parallel to the upper side strip, and a bar pivotally arranged in the inner frame, and being secured to the top at a point slightly outside the balancing-point of the top piece.

In testimony that I claim the foregoing as my invention I have signed my name, in the presence of two witnesses, this 2d day of July, 1903.

WILLIAM STRAWBRIDGE.

Witnesses:
CHARLES NICHOLAS COLLISON,
ARTHUR GORE COLLISON.